United States Patent
Kim et al.

(10) Patent No.: US 8,300,538 B2
(45) Date of Patent: Oct. 30, 2012

(54) METHOD AND SYSTEM FOR SETTING ROUTING PATH CONSIDERING HIDDEN NODE AND CARRIER SENSE INTERFERENCE, AND RECORDING MEDIUM THEREOF

(75) Inventors: Myungchul Kim, Daejeon (KR); Sungwon Kang, Sungnam-si (KR); Hammash Deema Ahmad Mohammad, Daejeon (KR)

(73) Assignee: KAIST (Korea Advanced Institute of Science and Technology), Daejeon (KR)

( * ) Notice: Subject to any disclaimer, the term of this patent is extended or adjusted under 35 U.S.C. 154(b) by 360 days.

(21) Appl. No.: 12/610,976

(22) Filed: Nov. 2, 2009

(65) Prior Publication Data

US 2011/0075578 A1    Mar. 31, 2011

(30) Foreign Application Priority Data

Sep. 28, 2009    (KR) .................. 10-2009-0091469

(51) Int. Cl.
*H04J 1/16* (2006.01)
(52) U.S. Cl. ........................ 370/238; 370/252
(58) Field of Classification Search .............. 370/229, 370/235, 238, 241, 252, 310, 310.1, 310.2, 370/328, 431, 445, 447; 709/238, 241
See application file for complete search history.

(56) References Cited

U.S. PATENT DOCUMENTS
2007/0002804 A1* 1/2007 Xiong et al. .................. 370/335

OTHER PUBLICATIONS

R. Draves, J. Padhye, B. Zill, Routing in Multi-radio, Multi-hop Wireless Mesh Networks, in: ACM Annual International Conference on Mobile Computing and Networking (MOBICOM), pp. 114-128, 2004.
D. De Couto, D. Aguayo, J. Bicket, and R. Morris, High-throughput Path Metric for Multi-Hop Wireless Routing, Proceedings of the 9th annual international conference on Mobile computing and networking (MOBICOM), pp. 134-146, 2003.
J. Sangiamwong and T. Sugiyama, Hidden Node Problem Aware Routing Metric for Wireless Lan Mesh Networks, The 18th Annual IEEE International Symposium on Personal, Indoor and Mobile Radio Communications (PIMRC), 2007.

* cited by examiner

*Primary Examiner* — Kwang B Yao
*Assistant Examiner* — Obaidul Huq
(74) *Attorney, Agent, or Firm* — Lowe Hauptman Ham & Berner, LLP

(57) ABSTRACT

A method of setting a routing path for transmitting a packet from a source node to a destination node in a wireless multi-hop network including plural nodes and plural links for connecting two nodes with each other. The method includes calculating carrier sense interference weights representing carrier sense interference related to the respective links and combining the carrier sense interference weights of the links included in at least one specific path connecting the source node with the destination node. The method further includes calculating hidden node weights representing hidden node problems related to the respective links and accumulating the hidden node weights of the links included in the path. The method further includes calculating a metric value for the specific path by combining the carrier sense interference weights and the hidden node weights, and determining the specific path with the least metric value as the routing path.

18 Claims, 4 Drawing Sheets

METHOD AND SYSTEM FOR SETTING ROUTING PATH CONSIDERING HIDDEN NODE AND CARRIER SENSE INTERFERENCE, AND RECORDING MEDIUM THEREOF

CROSS-REFERENCE TO RELATED APPLICATION

This application claims priority to Korean Patent Application No. 10-2009-0091469, filed on Sep. 28, 2009, and all the benefits accruing therefrom under 35 U.S.C. §119, the contents of which in its entirety are herein incorporated by reference.

BACKGROUND

1. Field

This disclosure relates to routing path setting in a computer network, and more particularly, to a method and a system for setting a routing path in consideration of hidden node and carrier sense interference awareness in order to improve network performance in a multi-hop wireless network, and a recording medium thereof.

2. Description of the Related Art

In a wireless mesh network which is a kind of multi-hop wireless network, network performance degrades dramatically as the size of the network increases due to the carrier sense interference and hidden node problem.

Employing multi-channel multi-radio has been shown as an effective approach to increase the wireless mesh network capacity. However, in order to obtain the maximum utilization of multi-channel networks, channels need to be assigned to links of each node so as to reduce the carrier sense interference and hidden node problem. Since the complexity of channel assignment was proven to be an NP-hard problem, a routing metric can be used to choose routing paths in a combination that considers factors such as channel diversity, intra-flow interference, inter-flow interference, and the hidden node problem after the channels are established.

The early routing metrics used for setting a routing path simply relied on hop count. However, since the hop count simply prefers only the shortest path, it is not an effective routing metric. Metric is a value, which a routing protocol consults to select an optimal path, and different metrics are used for different routing protocols.

In order to solve this problem, there was proposed an expected transmission count (ETX) metric, described in De Couto et al. D. De Couto, D. Aguayo, J. Bicket, and R. Morris, "High-throughput Path Metric for Multi-Hop Wireless Routing", ACM MOBICOM, on September 2003. The ETX estimates the status of the link by using the link packet loss ratio as a base for choosing a path with the best link quality. However, although it shows better performance than the shortest path, link bandwidth of the links was not considered, and only the link packet loss ratio was considered. In addition, a path with high channel diversity could not be selected, and the hidden node problem could not be solved.

In order to solve the problems of the ETX, there was disclosed a system and a method for link quality routing using a weighted cumulative expected transmission time metric in Korean Patent Publication No. 10-2006-0092811 filed on Jun. 22, 2005, by R. Draves, J. Padhye, and B. Zill. This method came to solve the channel diversity problem in the ETX. Furthermore, this method proposed an expected transmission time (EU) by improving the ETX using link bandwidth. Since each individual link uses ETX value, the EU calculates a time needed to transmit a single packet including retransmission over a link. A path is selected by calculating the total delay of a packet on the basis of those values and incorporating channel diversity.

Although the WCETT solves some of the problems in the ETX, it still has some problems.

The first problem is that the WCETT cannot distinguish or avoid a hidden node path since it does not consider hidden the node problem just like the ETX.

The second problem is that although links using the same channel on a path interfere with each other only in the case where they are in the carrier sense range, the WCETT includes links using the same channel for estimating the bottleneck channel over that path regardless of their location in the path, so that accurate calculation is impossible.

The third problem is that the WCETT did not consider the inter-flow interference but considered only the intra-flow interference.

To solve the hidden node problem that was not solved by the WCETT and the ETX, there was proposed "Hidden node problem aware routing metric for wireless LAN mesh networks," (IEEE PIMRC 2007) by J. Sangiamwong, T. Sugiyama. A routing metric distinguishes a hidden node by exchanging local link state announcement packets broadcasted in a neighbor discovery step in IEEE 802.11s and calculates a packet collision ratio due to the hidden node problem in consideration of packet transmission time in a MAC layer so as to be used for path selection. However, the routing metric could not suitably estimate the hidden node effect and did not consider the intra-flow or inter-flow interference.

SUMMARY

This disclosure provides a method of setting a routing path in consideration of hidden nodes and carrier interference, capable of improving routing performance in a wireless mesh network environment by minimizing hidden nodes and carrier sense interference.

This disclosure also provides a system for setting a routing path in consideration of hidden nodes and carrier sense interference, which applies the method of setting a routing path in consideration of hidden nodes and carrier sense interference.

This disclosure also provides a recording medium having embodied therein a computer program for the method of setting a routing path in consideration of hidden nodes and carrier sense interference.

In one aspect, there is provided a method of setting a routing path for transmitting a packet from a source node to a destination node in a wireless multi-hop network consisting of plural nodes and plural links for connecting two nodes with each other, comprising: calculating carrier sense interference weights representing carrier sense interference related to the respective links and combining the carrier sense interference weights of the links included in at least one specific path connecting the source node with the destination node; calculating hidden node weights representing hidden node problems related to the respective links and accumulating the hidden node weights of the links included in the path; and calculating a metric value for the specific path by combining the carrier sense interference weights and the hidden node weights, and determining the specific path with the least metric value as the routing path.

In the above aspect, the carrier sense interference weight represents the carrier sense interference among links in a path using the same shared channel or in adjacent paths, and the hidden node weight represents hidden node problems caused by the links in the same path or adjacent paths.

In addition, the wireless multi-hop network includes nodes with multiple heterogeneous radio transceivers to each of which is assigned a different channel.

In addition, the carrier sense interference weight is calculated by packet transmission time on the specific link in the path and packet retransmission number over the link.

In addition, the packet transmission time is calculated by using a fixed packet size, a pre-assigned raw link bandwidth, and MAC layer protocol inter-frame interval and control packets.

In addition, the packet retransmission number is calculated by using weighted forward and reverse delivery ratios along time over the specific link, and wherein the weighted forward and reverse delivery ratios are calculated by applying the exponential weighted averaging technique to two successive delivery ratios.

In addition, the hidden node weight is calculated by expected collision numbers due to all hidden links affecting the specific link in the path and the packet transmission time over the specific link.

In addition, the expected collision number is the number of transmissions of a packet due to collisions with the hidden node according to a hidden node collision (HNCOL) analytical model.

In addition, the hidden node weight is calculated by using the probability of having a collision with the hidden node, and the probability of a collision with the hidden node is calculated as follows:

$$Prob(HNCOL_{AB}) = \frac{Data\_pkt\_TT_{AB}}{VP}$$

where A and B are nodes, VP is a period for which a hidden node collision may occur in link A-B, and Data_pkt_TT is data packet transmission time.

In addition, considering that the total estimated packet transmission time due to carrier sense interference effect in the path p is WCEPTT_CS, the total estimated packet transmission time due to hidden node is CEPTT_HN, and WCEPTT_CS and CEPTT_HN are combined using the exponential moving averaging technique with a smoothing factor β, the total data transmission time is calculated as follows:

$$HIAM=\beta*WCEPTT\_CS_p+(1-\beta)*CEPTT\_HN_p$$

In another aspect, there is provided a system of setting a routing path for transmitting a packet from a source node to a destination node in a wireless multi-hop network consisting of plural nodes and plural links for connecting two nodes with each other, comprising: a mechanism for calculating carrier sense interference weights representing carrier sense interference related to the respective links and combining the carrier sense interference weights of the links included in at least one specific path connecting the source node with the destination node; a mechanism for calculating hidden node weights representing hidden node problems related to the respective links and accumulating the hidden node weights of the links included in the path; and a mechanism for calculating a metric value for the specific path by combining the carrier sense interference weights and the hidden node weights, and determining the specific path with the least metric value as the routing path.

In the above aspect, the carrier sense interference weight represents the carrier sense interference among links in a path using the same shared channel or in adjacent paths, and the hidden node weight represents hidden node problems caused by the links in the same path or adjacent paths.

In addition, the wireless multi-hop network includes nodes with multiple heterogeneous radio transceivers to each of which is assigned a different channel.

In addition, the carrier sense interference weight is calculated by packet transmission time on the specific link in the path and packet retransmission number over the link.

In addition, the packet transmission time is calculated by using a fixed packet size, a pre-assigned raw link bandwidth, and MAC layer protocol inter-frame interval and control packets.

In addition, the packet retransmission number is calculated by using weighted forward and reverse delivery ratios along time over the specific link, and wherein the weighted forward and reverse delivery ratios are calculated by applying the exponential weighted averaging technique to two successive delivery ratios.

In addition, the hidden node weight is calculated by expected collision numbers due to all hidden links affecting the specific link in the path and the packet transmission time over the specific link.

In addition, the expected collision number is the number of transmissions of a packet due to collisions with the hidden node according to a hidden node collision (HNCOL) analytical model.

In addition, considering that the total estimated packet transmission time due to carrier sense interference effect in the path p is WCEPTT_CS, the total estimated packet transmission time due to hidden node is CEPTT_HN, and WCEPTT_CS and CEPTT_HN are combined using the exponential moving averaging technique with a smoothing factor β, the total data transmission time is calculated as follows:

$$HIAM=\beta*WCEPTT\_CS_p+(1-\beta)*CEPTT\_HN_p$$

Accordingly, in the multi-channel multi-radio wireless mesh network, the path with minimized hidden node problem and carrier sense interference is selected to improve network performance. In addition, this routing metric is applicable for various routing protocols, so that routing performance improvement can be expected in various multi-hop multi-channel multi-radio wireless mesh network environments. Moreover, with regard to the overlapping packet transmission time spans in each channel, which occurs during hello packet broadcasting in the multi-radio wireless mesh network, packets are distributed according to the destination node and channels, so that the total network overhead can be reduced. Furthermore, routing can be stably maintained through the path which avoids the hidden node problem and carrier sense interference.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
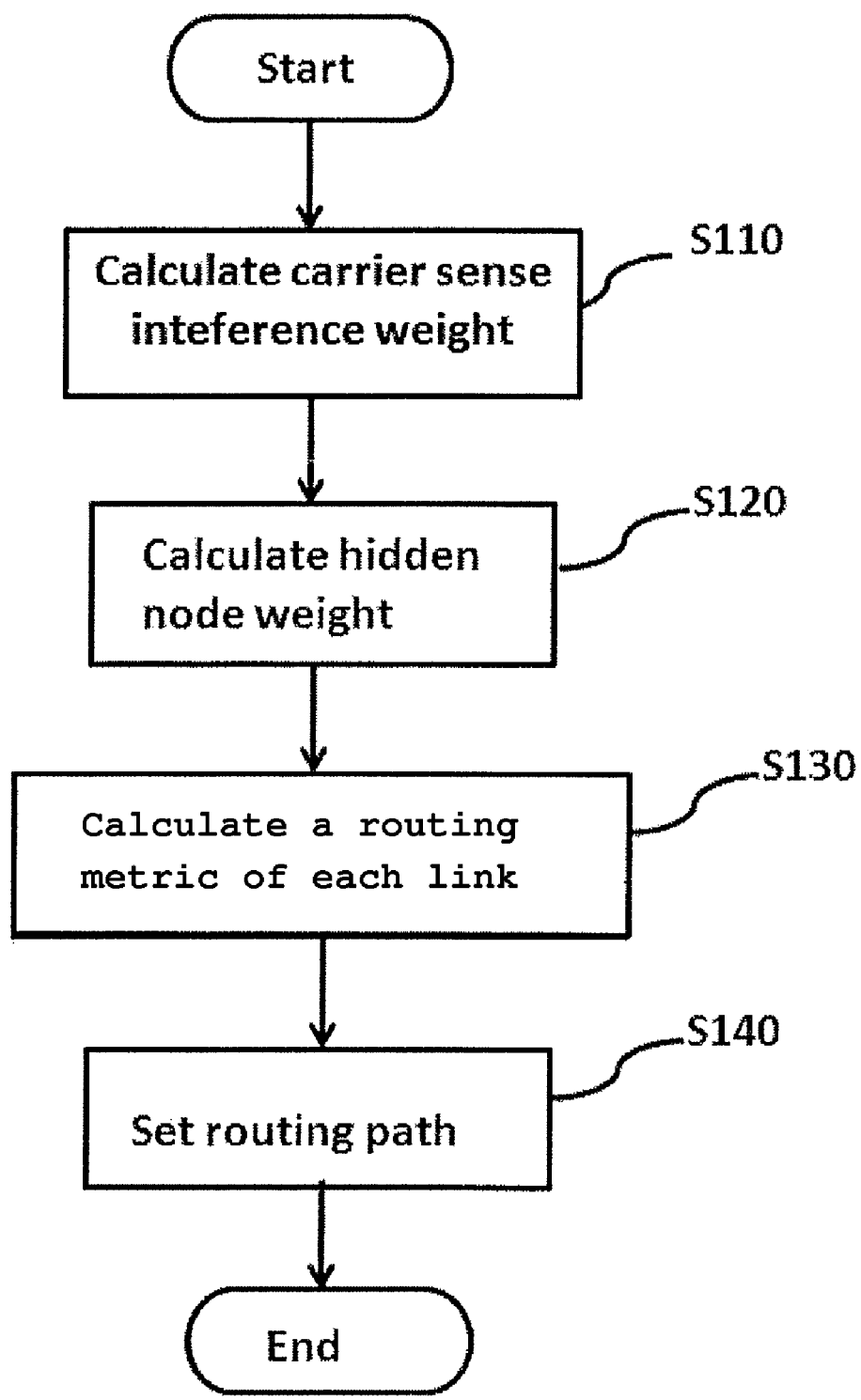
FIG. 1 is a flow diagram of a method of setting a routing path in consideration of a hidden node and interference awareness according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

This embodiment is to improve the performance of a network by using a routing metric in consideration of a hidden node and carrier sense interference.

Specifically, in order to prevent degradation of the performance of a network during data transmission between a sending node and a receiving node in a multi-hop multi-radio multi-channel network, data transmission times with respect to the hidden node problem and carrier sense interference are measured for each link.

For this, data packet transmission time with respect to the carrier sense interference is measured, and data packet transmission time in an environment with hidden nodes is measured.

Then, the data transmission time of each link is calculated by combining them, and the total data transmission time according to a link combination on a path is estimated, thereby performing routing path setting for selecting the best route according to the embodiment.

According to this embodiment, it is possible to set a routing path by minimizing intra-flow interference and inter-flow interference, and it is possible to minimize a collision phenomenon caused by the hidden node in each path.

In this embodiment, two weights are assigned: the first is the expected packet transmission time with carrier sense interference effect (EPTT_CS) and the second is the expected packet transmission time with hidden node effect (EPTT_HN).

Here, the EPTT_CS and the EPTT_HN are two important weights in each link, and the best route can be selected by estimating the total data transmission time using the link combinations on a path. This is a hidden node and interference aware routing metric (HIAM), the new routing metric proposed in this embodiment.

FIG. 1 is a flow diagram of a method of setting a routing path in consideration of a hidden node and carrier sense interference according to this embodiment.

Referring to FIG. 1, a carrier sense interference weight due to the carrier sense interference is calculated for a particular link on a path connecting a source node and a destination node in a wireless multi-hop network (S110).

Then, a hidden node weight due to the hidden node problem is calculated for the particular link (S120).

A routing metric of each link is calculated by combining the carrier sense interference weight and the hidden node weight (S130), and a path with the lowest routing metric is determined as a routing path from the source to destination nodes. (S140).

Each of the steps will be described in detail as follows.

Certain embodiments of the invention are designed for use in a wireless network with nodes having IEEE 802.11 conformant radios. However, other embodiments may be applied to networks based on different wireless technologies. This embodiment can be used together with one or more different techniques or mechanisms for improving network capacity in multi-hop wireless networks such as stripping techniques or directional antennas.

The HIAM routing metric according to this embodiment needs to calculate the EPTT_CS and EPTT_HN for each link as described above. For this, a fixed-size packet transmission time (PTT) needs to be calculated first.

The PTT is calculated by Equation 1:

$$PTT_{ij} = DIFS + DATA\_pkt\_TT + SIFS + ACK\_TT \qquad \text{[Equation 1]}$$

In Equation 1, $PTT_{ij}$ is a time needed to transmit a packet over the link connecting a node i and a node j. DIFS and SIFS are inter-frame intervals used in the MAC layer, DATA_pkt_TT is data packet transmission time, and ACK_TT is an ACK (acknowledgment) packet transmission time. In the MAC layer, the ACK packet is transmitted at a basic data rate of 1 Mbps.

DATA_pkt_TT is calculated by Equation 2, and ACK_TT is calculated by Equation 3.

$$DATA\_pkt\_TT = DATA \text{ packet size/link data rate} \qquad \text{[Equation 2]}$$

$$ACK\_TT = ACK \text{ packet size/basic data rate} \qquad \text{[Equation 3]}$$

The PTT is the total time needed to transmit a single packet over a link. A packet in the MAC layer of a sending node would not be considered to have been delivered successfully unless an ACK packet is received. Even in the case of packet loss, the sensing node has to wait for the ACK timeout to retransmit a packet. Therefore, including the ACK transmission time, SIFS and DIFS are necessary to have accurate estimation of packet transmission time over a link.

Assuming that the transmission range and carrier sense range are equal, collisions caused by the carrier sense nodes are negligible because the CSMA will prevent such cases, and RTS/CTS are turned off.

On those assumptions, HNCOL_num is calculated by an analytical model. In order to demonstrate this analytical model, an example in which in a simple topology composed of a chain of four nodes {A, B, C, D}, in which all nodes are connected to the direct neighbors by using the same channel, will be described. Link C-D is a hidden link for link A-B in this topology.

Since we are concerned with estimating the number of retransmissions caused by a hidden link for a single packet, we need to consider an interval of time that is long enough to transmit a single packet, and retransmit it in case of collisions due to the hidden node problem.

Since the maximum number of allowed retransmissions of the MAC layer is set as four, the total time interval, TIME, is defined as 5*PTT. This represents the total transmission time needed to send the original packet and its four allowed retransmissions in the case of collisions due to a hidden node problem. Knowing that the backoff intervals (maximum 512 µs) between retransmissions are negligible, they are not included in the TIME interval in our estimations.

In the TIME interval, unless link C-D started transmitting while link A-B of the above example was already doing so, the transmission over links A-B and C-D will not cause any collision.

This case won't happen while node B is transmitting over link B-C, where neither node A nor C would be able to transmit during that time. Because in link BC the node B is in the carrier sense range of both node C and node A, link B-C is a carrier sense link for both links A-B and C-D. Furthermore, if there are any other active links in the carrier sense range of the node A, the node A won't be able to transmit while the carrier sense nodes are transmitting, which will result in no collisions with the node C. The same also applies to the node A.

In order to obtain the vulnerable period where collisions might occur between links A-B and C-D in the interval TIME, we need to subtract both periods of time used for seizing the channel by the links in the carrier sense range of links A-B and C-D from the total time TIME. In order to estimate the period of time used by the carrier sense nodes in transmission of a packet over the links in the carrier sense range, we need to first estimate the probability that these nodes will have a chance to transmit the packet. This probability is estimated based on the assumption that all nodes have the same data rate. The probability is estimated by Equation 4:

$$Prob(CSlink_{AB}) = \frac{CSnumber_{AB}(Ch_n)}{CSnumber_{AB}(Ch_n)+1}.$$ [Equation 4]

In Equation 4, Prob($CSlink_{AB}$) denotes the probability that all carrier sense links for link A-B will have a channel in seizing the channel for data transmission. And, $CSnumber_{AB}(Ch_n)$ is the number of links which use the same channel $Ch_n$ as the link A-B in the carrier sense range of the link A-B. In Equation 4, the denominator is the total number of links in the same carrier sense range including the link A-B itself. This probability is estimated for both sides, the hidden link C-D and the affected link A-B.

Using these probabilities, CSlinks_TT (carrier sense links transmission time) can be estimated.

During the time, both links A-B and C-D remain idle and there will be no collisions due to the hidden node problem. Therefore, CSlinks_TT is estimated by Equation 5:

CSlinks_$TT_{AB,CD}$=[Prob($CSlinks_{AB}$)*$PTT_{AB}$+Prob($CSlinks_{CD}$)*$PTT_{CD}$] [Equation 5]

where the first part, Prob($CSlinks_{AB}$)*$PTT_{AB}$ represents the transmission time spent by links in the carrier sense range of link A-B, assuming that all links have the same bandwidth and the packet size is fixed. In other words, during this time the link A-B is idle. Prob($CSlinks_{AB}$) is the probability that links in the carrier sense range of the link A-B will have the chance to transmit, and $PTT_{AB}$ is the time needed to transmit a single packet on the link A-B. The same also applies for the second part of the equation.

By subtracting CSlinks_TT from the interval TIME, we can find the vulnerable period of time (VP) in which collisions are likely to occur.

The VP is a period in which the links A-B and C-D will have a chance to transmit and will have collisions over link A-B due to the hidden link C-D.

The VP is estimated by Equation 6:

VP=TIME−CSlinks−CSlinks_$TT_{AB,CD}$ [Equation 6]

In order to predict how many collisions will occur over the link A-B, we estimate the probability that a single packet can be transmitted during the VP.

The probability of hidden node collisions over link A-B, Prob($HNCOL_{AB}$) is estimated by Equation 7:

$$Prob(HNCOL_{AB}) = \frac{PTT_{AB}}{VP}.$$ [Equation 7]

In Equation 7, PTT is a time for which collisions may occur during the VP, and as described above, PTT includes both data packet transmission time and the ACK packet transmission time. Considering the assumed scenario, if the data packet has been successfully received by B from A, and B started transmitting the ACK packet to A, then C will not be able to transmit. Therefore, in order to obtain the effective collision time in PTT, we need to consider only the data packet transmission time since there will be no collisions throughout the ACK packet transmission time. This is due to having B in the carrier sense range of C, and therefore no collisions will occur through the ACK packet transmission time. The effective collision time in PTT is represented using Data_pkt_TT by Equation 8:

$$Prob(HNCOL_{AB}) = \frac{Data\_pkt\_TT_{AB}}{VP}$$ [Equation 8]

Consequently, in order to calculate the expected number of hidden node collisions, we take the floor of the inverse of Prob($HNCOL_{AB}$) as in Equation 9:

$$HNCOL\_num_{AB} = \left\lfloor \frac{1}{Prob(HNCOL_{AB})} \right\rfloor.$$ [Equation 9]

EPTT_HN is calculated considering collisions due to all the hidden nodes affecting this link by Equation 10:

$$EPTT\_HN_{ij} = PTT_{ij} * \sum_{fg \in H} HNCOL\_num_{ij,fg}.$$ [Equation 10]

In Equation 10, $PTT_{ij}$ is a packet transmission time of the link connecting node i and node j, H is the set of hidden links for link ij, and $HNCOL\_num_{ij,fg}$ is the expected number of collisions occurring over link ij due to hidden link fg. And, $$\sum_{fg \in H} \text{HNCOL\_num}_{ij,fg}$$

represents the total number of packet collisions caused by the set of all hidden link H for link ij. $\text{HNCOL\_num}_{ij,fg}$ is estimated using the HNCOL analytical model.

The CEPTT_HN path metric calculation is the summation of EPTT_HN values for all links in the route.

The CEPTT_HN is estimated by Equation 11:

$$\text{CEPTT\_HN}_p = \sum_{ij \in p} \text{EPTT\_HN}_{ij}. \quad [\text{Equation 11}]$$

The WCEPTT_CS of a HIAM routing metric according to the embodiment is calculated by measuring the number of retransmissions caused by the carrier sense interference using a modified ETX mechanism (METX).

There are two problems in applying the ETX to the HIAM routing metric. The first problem is that the interval used for deriving a loss ratio from the ETX is much longer than that of the HNCOL analytical model proposed in this embodiment. The second problem is that the maximum number of packet retransmissions estimated in the ETX is much larger than the number of retransmissions predicted by the HNCOL analytical model. The number of retransmission predicted by the analytical model according to this embodiment is not larger than 5. This number is the maximum number of packet retransmission including the packet transmission in the MAC layer. Therefore, the balance between the ETX and the HNCOL is needed. In the ETX, window can be changed to any interval time, but generally a window time of 10 seconds is uniformly used for calculation. If the window is changed to 1 second, inaccurate and not general result wherein no single retransmission occurs will be obtained. Accordingly, we have proposed a modified method for calculating a delivery ratio where all links starts from high delivery ratio that equals 1, based on the assumption that all links already received all packets successfully. Every second the ETX probe packet is broadcasted. If the packet did not reach the receiving side of the link, the delivery ratio for that link will decrease. For the next second, the number of lost packets in the first second to the next second will be accumulated. The delivery ratio is estimated by Equation 12.

$$DR_{f,r} = 1 - \frac{\text{accum\_pkt}}{(\text{max\_retrans} + 1)} \quad [\text{Equation 12}]$$

where $DR_{ij}$ denotes the delivery ratio of link ij for one direction (either forward or reverse). And accum_pkt is the accumulated lost packets, and max_retrans is the maximum retransmissions at MAC layer This process will be repeated for window of time that equals the maximum retransmission limit at MAC layer in addition to the original packet transmission, For the next five seconds, the delivery ratios will be restarted to one. The whole process done in the first five seconds will be repeated in terms of estimating the delivery ratio. However, in this method, the link status may be changed suddenly or the ETX value may be made inaccurate. In order to stabilize the ETX value that is likely to fluctuate, the exponentially weighted average technique as shown in Equation 13 is used for calculation.

$$\text{WDR} = (1-\alpha)*\text{oldDR} + \alpha*\text{newDR} \quad [\text{Equation 13}]$$

Where WDR is the Weighted Delivery Ratio, and $\alpha$ is a tunable variable, and $0 < \alpha < 1$. In this HIAM routing metric, $\alpha$ is set to 0.8 in order to give higher weight in the new ETX than the old one. Thus, the ETX values are much stable and reflect the current status at every second with relatively good accuracy.

Finally, the modified ETX (METX) is calculated by Equation.

$$\text{METX} = \frac{1}{\text{WDR}_f \times \text{WDR}_r} \quad [\text{Equation 14}]$$

where $\text{WDR}_f$ and $\text{WDR}_r$ are the weighted forward and the reverse delivery ratios over a link.

The EPTT_CS of link ij using the channel n is calculated by Equation 15.

$$\text{EPTT\_CS}_{ij}(\text{Ch}_n) = \text{METX}_{ij}(\text{Ch}_n) * \text{PTT}_{ij} \quad [\text{Equation 15}]$$

In order to consider both intra-flow and inter-flow interference by expanding WCETT, all the links that interfere with each link ij in path p are considered regardless of whether the interfering link is along the path p or adjacent to it. This is estimated by Equation 16:

$$CS_p = \bigcup_{ij \in p} \text{CSlinks}_{ij}(\text{Ch}_n) \quad [\text{Equation 16}]$$

where $CS_p$ is the set of links residing in the carrier sense range of link ij in the path p, included in the path p, or adjacent to it. $\text{CSlinks}_{ij}$ is the set of links residing in the carrier sense range of link ij including link ij itself and they are using channel n ($\text{CH}_n$). EPTT_CS for the interfering links in set $CS_p$ will be accumulated to estimate the total time needed to transmit a packet over path p, including its retransmissions and the waiting time to seize the medium. It is called $\text{CS\_EPTT\_sum}_p$ and is calculated by Equation 17.

$$\text{CS\_EPTT\_sum}_p = \sum_{uv \in CSp} \text{EPTT\_CS}_{uv}(\text{Ch}_n). \quad [\text{Equation 17}]$$

where $\text{EPTT\_CS}_{uv}(\text{Ch})_n$ is the total transmission time of the path p caused by link uv that belongs to the set $CS_p$.

Summing the EPTT values for interfering links residing in the carrier sense range of links in the path can represent the inter-flow and intra-flow interference.

For the calculation, in this embodiment, only the active links are considered, and idle links are not considered.

An active link represents a busy link which is transmitting a data flow, and an idle link represents a link which does not perform packet transmission or transfers only a control packet (RREQ or hello packet).

If a link interfering with the hidden link is not in a busy state, it does not affect other links.

In addition, according to the embodiment, the channel assignment problem is solved by using $$\beta^* \max_{i \leq j \leq k} X_j$$

(BCL: bottleneck link channel) obtained by modifying the second part of the original WCETT.

That is, it is modified to sum only the links using the same channel and residing in the carrier sense range. Through this modification, paths with better channel diversity can be identified. The new BLC is calculated by Equation 18.

$$BLC_p = \text{MAX}\left(\sum_{uv \in CSlinks_{ij}(Ch_n)} \text{EPTT\_CS}_{uv}(Ch_n)\right) ij.uv \in p \quad \text{[Equation 17]}$$

where EPTT_CS$_{uv}$ is the expected transmission time of link uv with the carrier sense interference, which is in the carrier sense range of link ij and is using the same channel as link ij. And both links are in the path p. The BLC is the maximum summation of links residing in the interference range of each other and using the same channel. The final WCEPTT_CS is calculated by Equation 19.

$$\text{WCEPTT\_CS}_p = (1-\lambda)*\text{CS\_EPTT\_sum}_p + \lambda*\text{BLC}_p \quad \text{[Equation 19]}$$

In this embodiment, a routing protocol obtained by replacing the ad hoc on-demand distance vector (AODV) routing protocol using the maximum hop count metric with the HIAM routing metric is included, and extending some of its control packets and the way of broadcasting the Hello packet, furthermore we modify it to suit multi-channel multi-radio environment. The modified routing protocol is composed of three main stages. The first stage is to exchange hello packets in order to initialize the environment of HIAM metric which is calculated for each link. The second stage is to broadcast the RREQ packet containing the HIAM value along a path. The third stage is to calculate HIAM routing metric at the destination for the three receiving RREQ packets, and choose a path with the lowest HIAM value.

In the hello packet exchange and environment setting stage, each node generates two tables: Direct_Neighbors_Table and Indirect_Neighbors_Table to identify the carrier sense interfering links and the hidden links. The Direct_Neighbors_Table includes information about directly connected neighbors residing in the transmission range of a node, and the Indirect_Neighbors_Table includes information about the neighbors of the direct neighbors.

The Direct_Neighbors_Table is built by each node using the received METX probe packets from directly connected neighbors. The node adds a copy of this table to its METX probe packet and broadcasts it periodically. Originally, the METX probe packet includes the table generated on the basis of the received probe packets from directly connected neighbors, so that this table includes direct neighbor address (DN_addr) and forward delivery ratio (DRf). According to a record corresponding to this table, four fields are added as described above. The channel (ChnID) field is to indicate the channel used by the direct neighbor. The EPTT_CS field is a field needed to consider the packet transmission time due to different carrier sense interference with its direct neighbor. The CS_num field represents the number of active links in the carrier sense range of a node using the same channel. The STATUS field is a Boolean variable that denotes whether a link is idle or active during the transfer of a flow of data packets. Whenever a packet is received from a direct neighbor, the radio through which the packet was received is set as active and the corresponding link is also set active.

Particularly, when the number of channels and neighbors increases, the size of the hello packet will be increased due to the newly added fields. Moreover, packet broadcasting in the multi-channel multi-radio mesh network is further increased since a copy of the original packet is broadcasted in each channel. The increase in the network overhead results in waste of the network bandwidth. In order to reduce such waste, in this embodiment, the broadcasting process of the hello packet is changed. Since the hello packet includes the Direct_Neighbors_Table, this table is divided into record groups on the basis of channel ID (ChnID), and each record group is included in different hello packet. Then, this hello packet is broadcasted only to the channels related to the record. In this manner, the hello packet is divided into smaller packets corresponding to the number of channels used by the node. For example, when three channels are used, the hello packet is allocated to three interfaces for the respective channels. Therefore, the packet is divided into three packets, and each divided packet has a size of about ⅓ of the size of the original packet. By using the method described above, the increase in the broadcasting overhead due to the increase in the number of channels can be suppressed.

The Indirect_Neighbors_Table is built using the periodically received Direct_Neighbors_Table included in the hello packets from directly connected neighbors. The Indirect_Neighbors_Table can give us information about the nodes outside the carrier sense range of a node and nodes in the carrier sense range of the direct neighbors.

This table will be used by each node to find the hidden links and estimate the probability of collisions with these links. The Indirect_Neighbors_Table consists of a total six fields (direct neighbor address, indirect neighbor address, ChnID, Indirect CS_num, STATUS, and EPTT_HN). The direct neighbor address is a field for retrieving the source address of the received hello packet having the Direct_Neighbors_Table of the sending node.

The indirect neighbor address and the remaining fields are filled with information contained in the received Direct_Neighbors_Table. The last field EPTT_HN is the expected packet transmission time including retransmissions due to hidden node problem. This field value will be estimated periodically using the information in the Direct_Neighbors_Table and Indirect_Neighbors_Table. The STATUS field represents whether the link status is active or idle in consideration of the active hidden links. The Indirect neighbor CS_num will be used to estimate the probability that the carrier sense nodes of the hidden link will get the chance to transmit. This probability is used to estimate the HNCOL_num value and consequently the EPTT_HN value.

Figure 2:
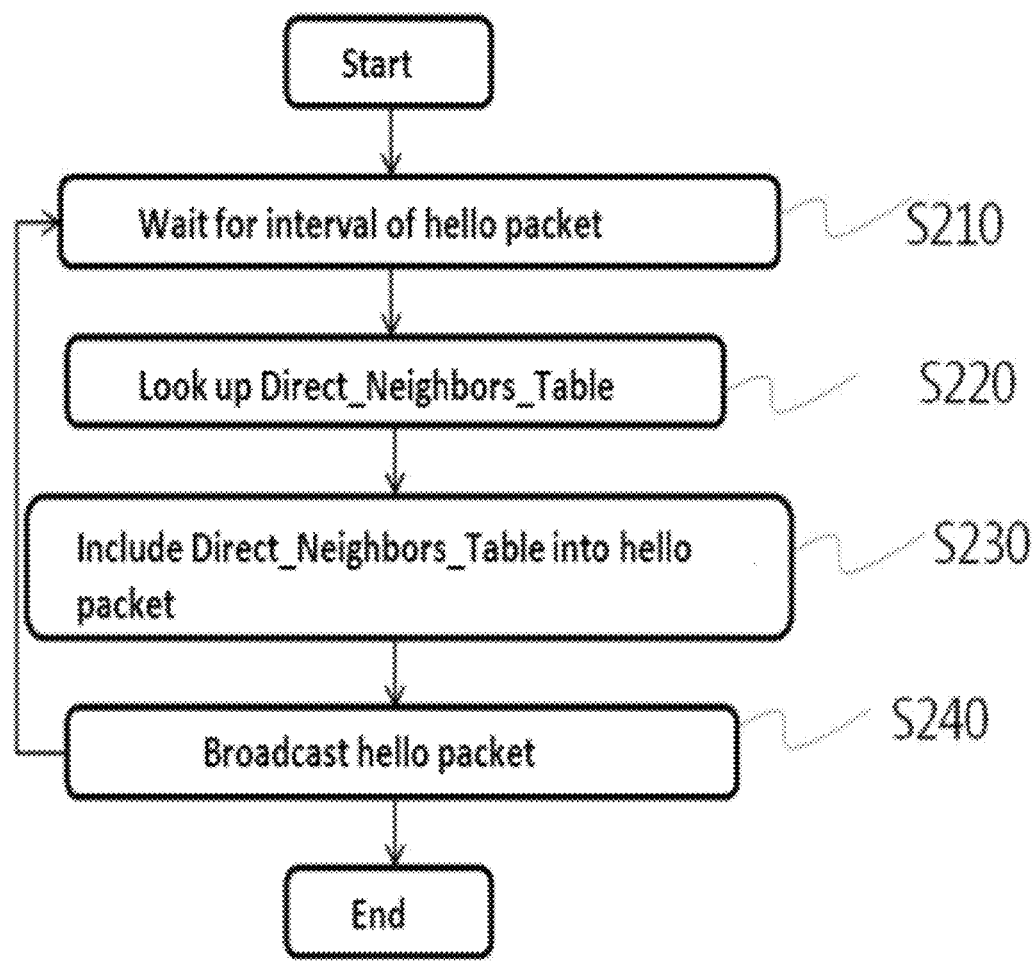
FIG. 2 illustrates hello packet exchange of AODV and environment setting of HIAM according to the embodiment.

The hello packet exchange and HIAM environment setting processes are performed as illustrated in FIG. 2.

FIG. 2 illustrates the hello packet exchange of the AODV and the HIAM environment setting according to the embodiment.

Referring to FIG. 2, the node will wait for the time out of the hello packet interval (S210).

Then, the node will look up its own Direct_Neighbors_Table (S220) and then include the Direct_Neighbors_Table into the hello packet (S230). Finally, the node will broadcast the hello packet (S240).

The Indirect_Neighbors_Table is built using the periodically received Direct_Neighbors_Table included in the hello packets from directly connected neighbors.

The Indirect_Neighbors_Table can give use information about the neighbors of the directly connected neighbors of a node.

Therefore, this table can be used for each node to find the hidden link and estimate the probability of collisions with the hidden link.

The Indirect_Neighbors_Table consists of a total of six fields.

The first field is the direct neighbor address retrieved from the source address of the received hello packet.

The second field is the indirect neighbor address which corresponds to the node addresses in the local table contained in the received hello packet.

The third, fourth, and fifth fields are filled with information contained in the received Direct_Neighbors_Table, and they are respectively: CS-num, channel ID, and STATUS.

The sixth field EPTT_HN represents the expected packet transmission time due to hidden node problem.

These six field values will be estimated periodically using the information in the Direct_Neighbors_Table and Indirect_Neighbors_Table. Only the active hidden links are considered in the protocol of this embodiment.

Then the indirect neighbor CS_num will be used to estimate the probability that the carrier sense nodes of the hidden link will get the chance to transmit.

This probability is used to estimate the HNCOL_num value and consequently the EPTT_HN value.

Figure 3:
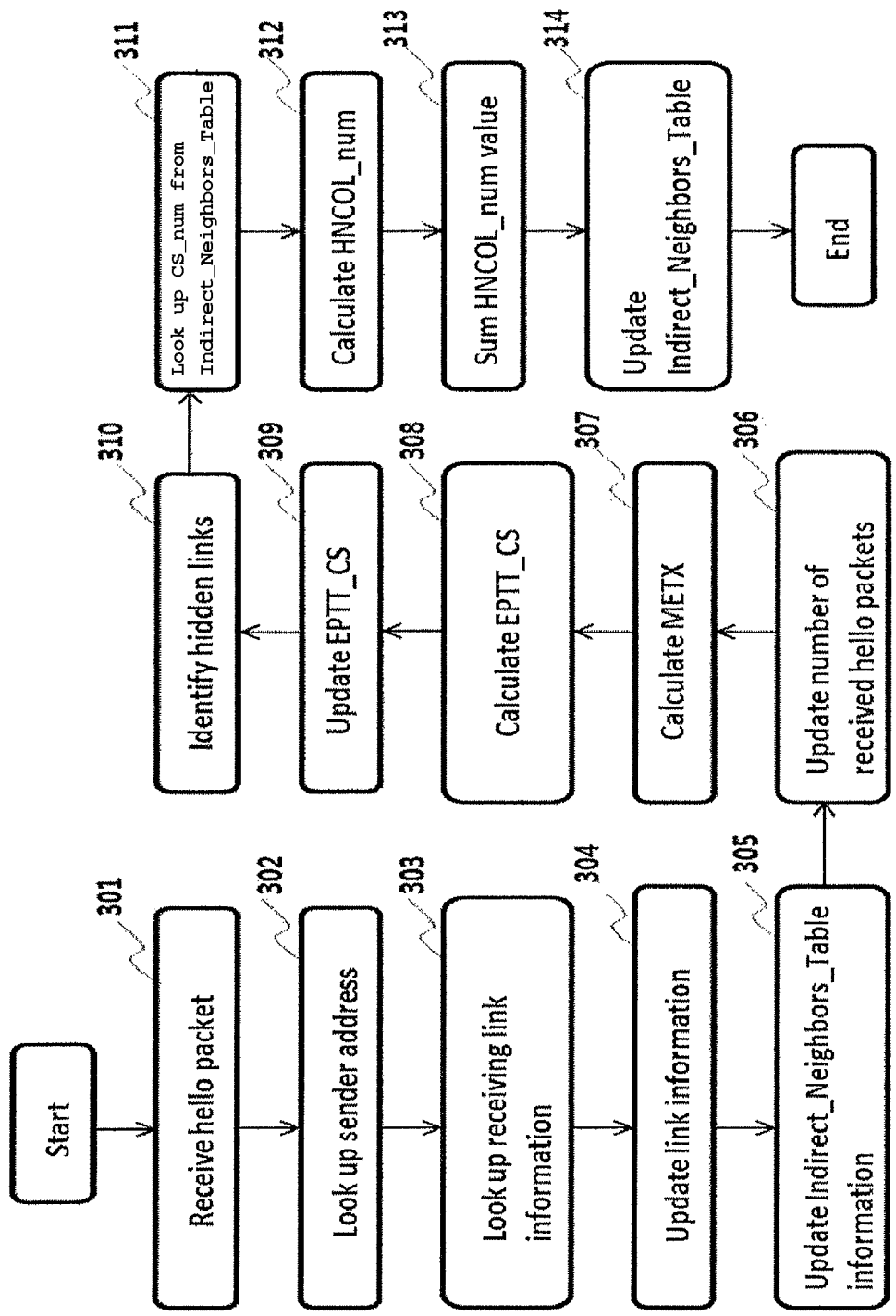
FIG. 3 illustrates the steps of processing the reception of the hello packet at the receiving side.

FIG. 3 illustrates the steps of processing the reception of the hello packet at the receiving side.

Referring to FIG. 3, after the hello packet is received (301), the receiver node retrieves from the hello packet the sender address (302). And then it looks up from the received hello packet the information on the receiving link (303).

Based on the sender address, the receiving link record can be located in the Direct_Neighbors_Table and updated with the link related information (304).

After that, the node will update the Indirect_Neighbors_Table with all the information stored in the hello packet about the directly connected neighbors of the sender (305). The node updates the number of received hello packets over the receiving link (306). The node calculates METX value using the calculated forward delivery ratio and the reverse delivery ratio received in the hello packet (307).

The node uses the METX value to estimate the EPTT_CS value (308), and updates the EPTT_CS value in the receiving link record at the Direct_Neighbors_Table (309).

And the node identifies the hidden link for the receiving link direction from the sender side to the receiving side (310).

The node looks up the hidden link's CS_num from the Indirect_Neighbors_Table (311). The node calculates the HNCOL_num caused by each hidden link (312).

The node sums the HNCOL_num values (313), and then calculates the EPTT_HN of the affected link (314).

Finally, each node updates the Indirect_Neighbors_Table with the affected EPTT_HN value (315).

This embodiment includes the RREQ packet broadcasting stage that is the second stage in a routing protocol such as AODV. Whenever a node wants to send a data packet to another node, it should establish a route by flooding a route request (RREQ) packet. The RREQ packet in the AODV routing protocol contains five additional fields (forwarding node address, ChID, EPTT_CS, CS_EPTT_SUM, and EPTT_HN) as well as its original fields (the first and second fields, that is, source address and sequence number, destination address and sequence number). These five fields are needed for the destination node to calculate HIAM.

Whenever a node receives a RREQ packet, it looks up the address of the node to send this RREQ and updates to the channel used in the radio. And then the node retrieves a record of this link in the Direct_Neighbors_Table by using the two values and calculates the EPTT_CS value corresponding to this link. The EPTT_CS values will be used to estimate the CS_EPTT_sum for the path the RREQ packet passed through by using what is already stored in the RREQ packet by previous hops. In addition, this node will use the EPTT_CS values stored in the RREQ packet by the previous hops for BLC calculation for that path. Last, the RREQ packet updates the EPTT_HN value of the link obtained from the Indirect_Neighbors_Table.

On the basis of the HIAM value calculated using the received RREQ packet, the node compares the path of this RREQ packet with the path stored in the routing table by the previously received RREQ packet having the same combination of source and destination. When the HIAM value calculated using the received RREQ packet is better than the value stored in the routing table, the routing table is updated and this RREQ is broadcasted. Otherwise, the RREQ is dropped.

This embodiment includes the RREP initializing process which is the third process in the routing protocol. Route reply (RREP) packet initiation by intermediate nodes is disabled and only the destination is allowed to initiate the RREP. The destination node will wait for three RREQ packets at the maximum in specified interval time. When all of them are received in that interval, the HIAM routing metric will be calculated for each of the three RREQ and a comparison will be conducted among them. As a result, a path with the lowest value will be chosen. On the other hand, if the interval is passed and the number of received RREQ packets is less than three, the routing metric will calculate only for the RREQ packets received in that interval, and a comparison will be conducted between them.

Figure 4:
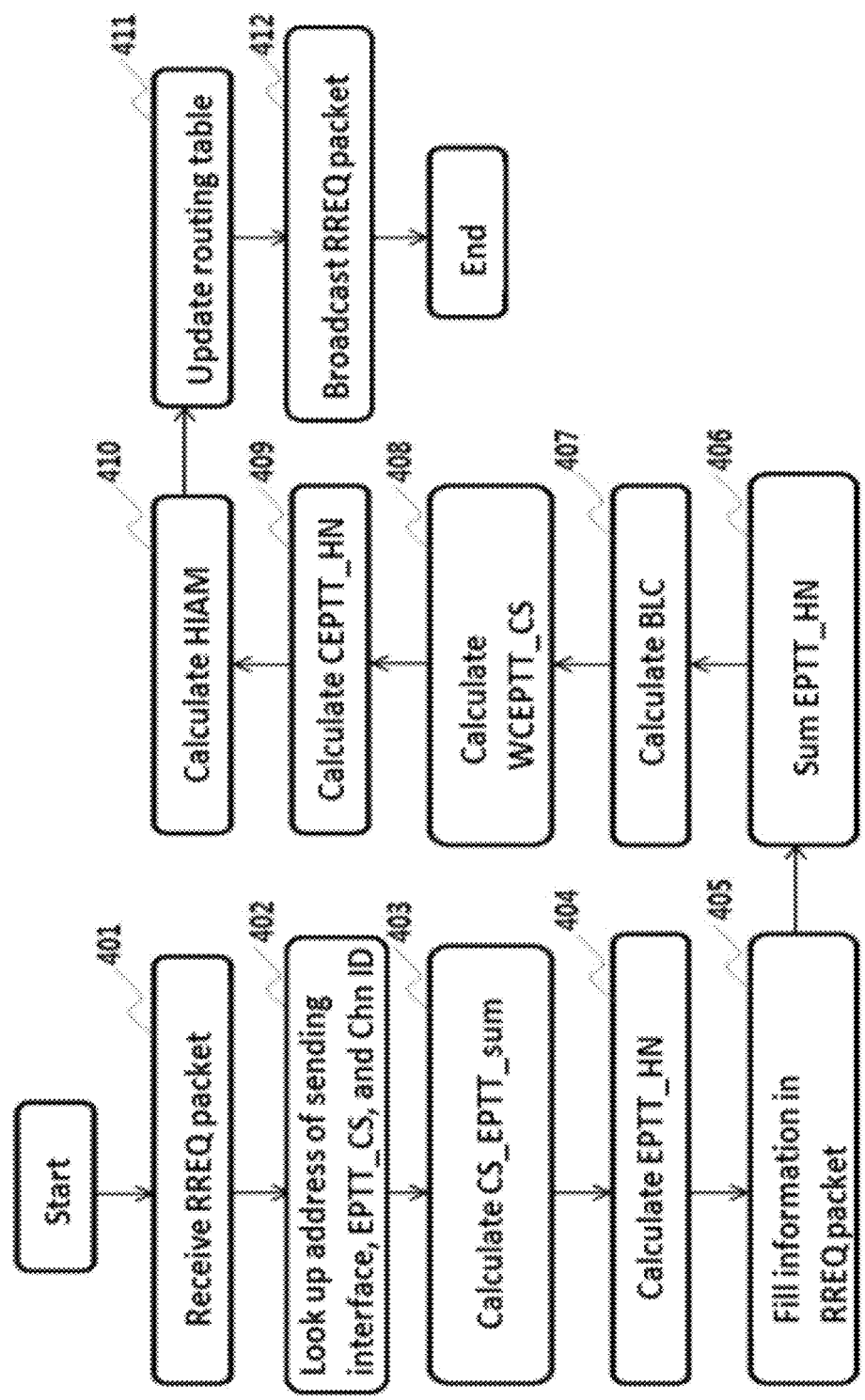
FIG. 4 illustrates the steps proceeding at the receiving node of a RREQ packet.

FIG. 4 illustrates the steps proceeding at the receiving node of a RREQ packet.

Referring to FIG. 4, the node receives the RREQ packet (401), and looks up the address of the sending interface, EPTT-CS, and ChnID from the Direct_Neighbors_Table (402).

The node calculates the CS_EPTT_sum for the receiving link using the Direct_Neighbors_Table (403).

And then the node calculates the EPTT_HN for the receiving link from the Indirect_Neighbors_Table (404) and stores all the above information in the RREQ packet (405).

After that, the node sums the EPTT_HN for all the links in the current path stored in the RREQ packet (406) and estimates the BLC value (407).

And then the node estimates WCEPTT_CS value using the values of calculated CS_EPTT_sum and BLC (408). Also the node calculates CEPTT_HN using EPTT_HN (409). And then the node calculates HIAM (410). After that, the node will update the routing table (411) and broadcast the RREQ packet (412).

The present invention may be embodied as a software. When embodied as a software, configurations of the invention may be code segments for executing the required operation.

Programs or code segments can be stored in a processor readable medium or can be transmitted by computer data signals combined with carrier waves in a transfer medium or a communication network.

The computer readable recording medium includes any data storage device that can store data which can be thereafter read by a computer system. Examples of the computer readable recording medium include read-only memory (ROM), random-access memory (RAM), CD-ROMs, DVD-ROM, DVD-RAM, magnetic tapes, floppy disks, hard disks, and optical data storage devices.

In addition, the computer readable recording medium can also be distributed over networked computer system so that the computer readable code may be stored and executed in a distributed fashion.

While the exemplary embodiments have been shown and described, it will be understood by those skilled in the art that various changes in form and details may be made to the embodiments without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A method of setting a routing path for transmitting a packet from a source node to a destination node in a wireless multi-hop network consisting of plural nodes and plural links for connecting two nodes with each other, comprising:
calculating carrier sense interference weights representing carrier sense interference related to the respective links and combining the carrier sense interference weights of the links included in at least one specific path connecting the source node with the destination node;
calculating hidden node weights representing hidden node problems related to the respective links and accumulating the hidden node weights of the links included in the path, wherein the hidden node weight is calculated by expected collision numbers due to all hidden links affecting the specific link in the path and the packet transmission time over the specific link, and the expected collision number is the number of transmissions of a packet due to collisions with the hidden node according to a hidden node collision (HNCOL) analytical model; and
calculating a metric value for the specific path by combining the carrier sense interference weights and the hidden node weights, and determining the specific path with the least metric value as the routing path.

2. The method according to claim 1,
wherein the carrier sense interference weight represents the carrier sense interference among links in a path using the same shared channel or in adjacent paths, and
wherein the hidden node weight represents hidden node problems caused by the links in the same path or adjacent paths.

3. The method according to claim 1, wherein the wireless multi-hop network includes nodes with multiple heterogeneous radio transceivers to each of which is assigned a different channel.

4. The method according to claim 1, wherein the carrier sense interference weight is calculated by packet transmission time on the specific link in the path and packet retransmission number over the link.

5. The method according to claim 4, wherein the packet transmission time is calculated by using a fixed packet size, a pre-assigned raw link bandwidth, and MAC layer protocol inter-frame spacing and control packets.

6. The method according to claim 4, wherein the packet retransmission number is calculated by using weighted forward and reverse delivery ratios along time over the specific link, and wherein the weighted forward and reverse delivery ratios are calculated by applying the exponential weighted averaging technique to two successive delivery ratios.

7. The method according to claim 1,
wherein the hidden node weight is calculated by using the probability of having a collision with the hidden node, and
wherein the probability of a collision with the hidden node is calculated by Equation 1 as follows:

$$Prob(HNCOL_{AB}) = \frac{\text{Data\_pkt\_TT}_{AB}}{VP} \quad (1)$$

where A and B are nodes, VP is a period for which a hidden node collision may occur in link A-B, and Data_pkt_TT is data packet transmission time.

8. The method according to claim 1, wherein, considering that the total estimated packet transmission time due to carrier sense interference effect in the path p is WCEPTT_CS, the total estimated packet transmission time due to hidden node is CEPTT_HN, and WCEPTT_CS and CEPTT_HN are combined using the exponential moving averaging technique with a smoothing factor β, the total data transmission time is calculated by Equation 2 as follows:

$$\text{HIAM} = \beta * \text{WCEPTT\_CS}_p + (1-\beta) * \text{CEPTT\_HN}_p \quad (2).$$

9. The method according to claim 8, further comprising updating a routing table based on a value of HIAM.

10. A non-transitory recording medium having embodied therein a computer program for the method of claim 1.

11. The method according to claim 1, further comprising updating an Indirect_Neighbors_Table based on the HNCOL.

12. A system of setting a routing path for transmitting a packet from a source node to a destination node in a wireless multi-hop network consisting of plural nodes and plural links for connecting two nodes with each other, comprising:
a processor configured to calculating carrier sense interference weights representing carrier sense interference related to the respective links and combining the carrier sense interference weights of the links included in at least one specific path connecting the source node with the destination node;
the processor configured to calculating hidden node weights representing hidden node problems related to the respective links and accumulating the hidden node weights of the links included in the path; and
the processor configured to calculating a metric value for the specific path by combining the carrier sense interference weights and the hidden node weights, and determining the specific path with the least metric value as the routing path,
wherein the wireless multi-hop network includes nodes with multiple heterogeneous radio transceivers to each of which is assigned a different channel,
wherein the hidden node weight is calculated by expected collision numbers due to all hidden links affecting the specific link in the path and the packet transmission time over the specific link, the expected collision number is the number of transmissions of a packet due to collisions with the hidden node according to a hidden node collision (HNCOL) analytical model.

13. The system according to claim 12,
wherein the carrier sense interference weight represents the carrier sense interference among links in a path using the same shared channel or in adjacent paths, and
wherein the hidden node weight represents hidden node problems caused by the links in the same path or adjacent paths.

14. The system according to claim 12, wherein the carrier sense interference weight is calculated by packet transmission time on the specific link in the path and packet retransmission number over the link.

15. The system according to claim 14, wherein the packet transmission time is calculated by using a fixed packet size, a pre-assigned raw link bandwidth, and MAC layer protocol inter-frame interval and control packets.

16. The system according to claim 14, wherein the packet retransmission number is calculated by using weighted forward and reverse delivery ratios along time over the specific link, and wherein the modified forward and reverse delivery ratios are calculated by applying exponential weighted averaging techniques to two successive delivery ratios.

17. The system according to claim 12, wherein, considering that the total estimated packet transmission time due to carrier sense interference effect in the path p is WCEPTT_CS, the total estimated packet transmission time due to hidden node is CEPTT_HN, and WCEPTT_CS and CEPTT_HN are combined using the exponential moving averaging technique with a smoothing factor $\beta$, the total data transmission time is calculated by Equation 3 as follows:

$$\text{HIAM}=\beta*\text{WCEPTT\_CS}_p+(1-\beta)*\text{CEPTT\_HN}_p \tag{3}$$

18. The system according to claim 12,
wherein the hidden node weight is calculated by using the probability of having a collision with the hidden node, and
wherein the probability of a collision with the hidden node is calculated by Equation 1 as follows:

$$Prob(HNCOL_{AB}) = \frac{\text{Data\_pkt\_TT}_{AB}}{VP} \tag{1}$$

where A and B are nodes, VP is a period for which a hidden node collision may occur in link A-B, and Data_pkt_TT is data packet transmission time.

* * * * *